United States Patent [19]

Yamada et al.

[11] Patent Number: 4,710,911

[45] Date of Patent: Dec. 1, 1987

[54] METHOD FOR RECORDING, REPRODUCING AND ERASING OPTICAL INFORMATION

[75] Inventors: Noboru Yamada; Michiyoshi Nagashima, both of Hirakata; Kenichi Nishiuchi, Moriguchi, all of Japan

[73] Assignee: Matsushita Electric Industrial Co., Ltd., Osaka, Japan

[21] Appl. No.: 724,887

[22] Filed: Apr. 19, 1985

[30] Foreign Application Priority Data

Apr. 27, 1984 [JP] Japan ............................ 59-86474

[51] Int. Cl.⁴ ................................................. G11B 7/125
[52] U.S. Cl. ................................. 369/100; 369/111; 369/116; 369/284; 346/76 L
[58] Field of Search ............. 369/100, 111, 284, 121, 369/122, 116, 44; 358/344; 365/126; 346/76 L, 77 E

[56] References Cited

U.S. PATENT DOCUMENTS

| | | | |
|---|---|---|---|
| 4,278,734 | 7/1981 | Ohta | 365/127 |
| 4,403,318 | 9/1983 | Nagashima | 369/100 |
| 4,564,931 | 1/1986 | Ohara | 369/111 |
| 4,566,088 | 1/1986 | Yoshida | 369/111 |

FOREIGN PATENT DOCUMENTS

| | | | |
|---|---|---|---|
| 14814 | 4/1984 | Japan | 369/100 |
| 71140 | 4/1984 | Japan | 369/100 |
| 68844 | 4/1984 | Japan | 369/100 |

OTHER PUBLICATIONS

"Erasable Optical Disc Using $TeO_x$ Thin Films", by Yamada, Japan Display '83, pp. 46-48, ©1983.
English translation for Japanese Pat. No. 58-58158, published 4/1/83.

Primary Examiner—Alan Faber
Attorney, Agent, or Firm—Stevens, Davis, Miller & Mosher

[57] ABSTRACT

A read/write optical disk system for performing high-density recording, reproduction and erasing of information signals by utilizing reversible structural changes between the crystalline and amorphous states of a chalcogenide glass film or the like and a recording, reproducing and erasing method therefor. In the method of this invention, during the period of recording and erasing, respectively, an exposed film area is first heated beyond its melting point to obtain a random state of its atomic arrangement and the rate of cooling from this melted state is controlled so as to obtain a recorded state or an erased state. This method is realized in the system by arranging a plurality of laser spots of different intensities and lengths in proximity to each other on the same track thereby ensuring high-quality erasing involving no danger of any incomplete erasure.

14 Claims, 12 Drawing Figures

(A)

(B)

(C)

METHOD FOR RECORDING, REPRODUCING AND ERASING OPTICAL INFORMATION

The present invention relates to an optical disk system for recording, reproducing and erasing information signals on an optical disk and a method for recording, reproducing and erasing such information signals.

Techniques are well known in the art by which a laser light beam is focussed through a lens system into a small spot of beam on a recording medium so that physical changes or chemical changes are caused in the illuminated area by means of the high energy density of the spot and information is recorded by means of the changes. A large number of research and development case examples on the techniques have been reported.

With a view to obtaining a suitable recording medium, research and development has produces thin films of the type in which the illuminated area is selectively vaporized and then films of the type in which the optical constants (n=refractive index, k=extinction coefficient) are selectively changed and consequently the reflectivity and transmittance are changed. Of these thin films, the former type is considered to be suitable for recording archival information since the shape of its recorded area is changed irreversibly and this type is not capable for example of correcting and rewriting signals. On the contrary, as in the case of the latter type, a recording medium in which the recorded area is not changed in shape but changed only in reflectivity and transmittance selectively has possibility of not only recording and reproducing signals but also serving a function of selectively erasing the recorded information signals to correct or rewrite the information signals (this function is here inafter referred to as an erasing function).

For example, a thin film of tellurium oxide TeOx ($0<X<2$) including sulfur and selenium additives (Japanese Laid-Open Patent Application No. 55-28530which coresponds to U.S. Pat. No. 4,278,734) possesses the above-mentioned erasable properties. These properties are also possessed by a thin film of TeOx ($0<X<2$) including additives such as tin, lead, germanium and antimony (Japanese Laid-Open Patent Application No. 59-185048). These systems are for example formed by vapor desposition on disk substrates made of acrylic resin or the like. The resulting thin film is usually in a state which is called as an X-ray amorphous. And the whole thin film is crystallized by a heat treatment. And this state is referred to as an unrecorded state. When recording, the thin film is exposed to a laser beam so that the exposed area is instantaneously raised in temperature to as high as several hundred degrees centigrade and turned to a melted state or a softened state close thereto and then the exposed area is rapidly cooled. As a result of this operation, the exposed area is changed to an X-ray amorphous state so that generally the reflectivity is decreased and the recording is effected. When erasing, the irradiation power of the laser beam is decreased and the thin film is exposed for a time slightly longer than the exposure time for recording. Thus, the exposed area is maintained at a temperature higher than the crystallization temperature for a short time so that the crystallinity is restored and the reflectivity is increased thereby restoring the initial state. While a heating time of less than several hundreds nano seconds is sufficient for the purpose of recording, it is considered that a response time of several hundreds nano seconds or over is required for the purpose of erasing.

As a result, when using such a recording medium in which response times required for recording and for erasing differ from each other, it is necessary to devise a method such that the recording and erasing signals on the disk are effected in real time without having recourse for example to a method of varying the rotation speed of the disk.

A method is known in the art (Japanese Patent Publication No. 59-14814) in which the irradiating spot length of a laser beam is different between recording and erasing such that during the recording the laser beam is focussed into a circular spot and during the erasing the laser beam is formed into a long, narrow spot thereby varying the exposure light power and the exposure time.

In other words, the laser beam generated from a laser diode is formed into one or the other of the different spot shapes through the suitable selection of optical systems in the optical path and during the erasing an area to be erased is selectively exposed. This method makes it possible to effect the erasing at the same disk rotation speed as the recording. In this case, however, it is not possible to perform so-called concurrent operations of erasing and recording such that the previously recorded signals are erased and the succeeding signals are recorded.

Then, a method has been proposed (Japanese Laid-Open Patent Application No. 59-68844 and No. 59-71140) in which two separate laser beams for the purpose of recording and erasing, respectively, are used. More specifically, two laser beams of different wavelengths are passed through a single optical system so as to focuss one of the beams into a circular spot and the other beam into an elliptical spot and the two spots are arranged in close proximity to each other within the same track thereby accomplishing the concurrent operations of recording and erasing in real time.

FIG. 1 of the accompanying drawings shows an example of the spot arrangement in which a recording laser beam spot a and an erasing laser beam spot $a_2$ are arranged on the same track $a_1$. The spot $a_1$ of the beam of relatively slightly longer, wavelength is focussed into a small spot of the order of the diffraction limit and used for servo controlling, recording and reproducing purposes. The spot $a_2$ of the beam of relatively a little bit shorter wavelength is formed through the lens system into an elongated spot of about 20 $\mu$m in terms of a half-width value of the peak laser power on the recording surface and used for erasing purposes (The Third Japan Display, Applied Paper Collection, P46). FIGS. 2(A) and (B) show the temperature variations in the exposed area passed over by the two spots. When the spot $a_1$ is moved past the track, the exposed area is rapidly increased in temperature and then cooled rapidly as shown in FIG. 2(A). On the other hand, when the spot $a_2$ is moved past the track, the exposed area is rather slowly raised in temperature and then cooled slowly as shown in FIG. 2(B). In this way, the recording and erasing are performed. While this method features that both the recording and erasing are performed in real time by the use of a simple construction, during the erasing the laser beam must be expanded into an elongated spot so as to maintain the temperature required for crystallization for a while and further there is a serious disadvantage that an excessively high power laser must be used to ensure a sufficient light power density for the desired temperature rise.

Another method has been proposed (U.S. Pat. No. 4,403,318) in which erasing is effected by successively projecting a plurality of laser beams onto the area which is to be erased. FIG. 3 shows another example in which a servo controlling and reproducing laser spot $b_1$ and erasing laser spots $b_2$, $b_3$ and $b_4$ are arranged on the same track 1. The spot $b_1$ is shorter in wavelength than the spots $b_2$, $b_3$ and $b_4$. In this case, the recording is effected by, for example, the spot $b_2$ by increasing its light power density while tracing the recording signal track by the spot $b_1$ and the erasing is effected by successively projecting the spots $b_2$, $b_3$ and $b_4$. Alternatively, the reproduction and recording are effected by the laser spot $b_1$ by varying its light power and the erasing is effected by using all of the laser spots $b_1$, $b_2$, $b_3$ and $b_4$. In this case, it is considered to be more effective if the laser spots $b_1$, $b_2$, $b_3$ and $b_4$ are each decreased in light power density from the preceding one in this order.

This method is said to be suitable for ensuring the required exposure time for crystallization while maintaining the light power density required for restoring the crystallinity from the X-ray amorphous state (or erasing) at a sufficient level. In other words, it is considered that the arrangement of a plurality of laser spots has the effect of ensuring a long exposure time without decreasing the light power density and this method is very excellent for accomplishing the real-time erasing by using the presently attained a laser power at laser diode.

However, further research and development has shown the following fact. In the case of recording thin films of the type which utilizes the phase transformation between the amorphous and crystalline states, a phenomenon may occur in which the resulting crystalline state and hence the reflectivity or transmittance differs between the following two cases where an as-vapor-deposited and untreated amorphous-state thin film is simply crystallized by such method as heat treatment and where an amorphous-state thin film which was obtained by first changing to a liquid phase by heating it with a strong light beam such as a laser beam of laser diode and then cooling it rapidly, is crystallized by a heat treatment. More strictly, it has been shown that similarly some differences occur between a crystalline state obtained by heat treating a solid-phase amorphous state transformed from a liquid phase as mentioned previously and that obtained directly from a liquid phase by slow cooling. If the recorded signal (the solid-phase amorphous state) on the track is to be erased by the above-mentioned methods, due to this phenomenon, while the amorphous-state area forming the recorded signal can be crystallized by any of the methods, slight variations are caused in optical constants between the erased area where the signals had been recorded and the peripheral or adjacent crystalline areas where the signals had not been recorded and these variations are detected as a difference in reflectivity or transmittance. In other words, it is impossible as a matter of principle to completely erase the previous signal.

It is an object of the present invention to provide an improved recording and erasing method of the type employing a plurality of laser diode beams, which ensures the complete recording and erasing without any residual signal after erasing by means of a recording medium which decreases its optical constants when heated and cooled rapidly and increases its optical constants when heated and cooled slowly.

It is another object of the invention to provide an improved recording and erasing method which is capable of effecting the concurrent recording and erasing operations in real time by a simple laser beam arrangement.

The recording and erasing method of this invention features that during both the recording and erasing a laser spot of a high light power density is projected onto a recording medium to heat it to such a high temperature that it is melted instantaneously, that during the recording operation the recording medium is rapidly cooled from its liquid-phase state and the ordering of the atoms at the melted state is kept thereby obtaining a state with the reduced optical constants and providing a recorded signal, and that during the erasing operation, in order to slowly cool the recording medium from the liquid-phase state, after the laser spot for melting purposes a laser spot or spots of relatively low light power densites are immediately projected to control the cooling rate in such a manner that the recording medium is efficiently crystallized directly from the liquid phase and the optical constants are increased in a short period of time thereby effecting the erasing.

In this case, the recorded signal area (the X-ray amorphous state) and the adjacent unrecorded areas (the crystalline state) are exposed without distinction and thus the two areas are crystallized from the liquid phase in all the same manner thereby effecting the perfect erasing without any difference in crystalline state between the two areas and without any incomplete erasure.

Also, while there occurs some difference in the initial condition of the temperature distribution on the track between cases where the erasing and recording are concurrently effected by arranging a recording spot after the erasing spot and where only the recording is effected without effecting erasing, in accordance with the present invention the erasing spot is used even during the recording onto the unrecorded track and during the recording the erasing spot is always caused to go first thereby preventing the occurrence of such difference in the initial condition and enabling the concurrent erasing and recording.

The present invention will be apparent from the following detailed description taken in conjunction with the accompanying drawings, in which:

FIG. 1 shows a spot arrangement according to a prior art method in which a recording laser spot and an erasing laser spot are arranged on the same track;

FIGS. 2(A) and (B) show the manners in which the temperature of an illuminated area is varied in response to the separate crossing of the laser spots;

In accordance with an optical information recording reproducing and erasing method of this invention, while laser beams are used as a light source, the light source should preferably be provided by means of laser diodes because they reduce the size of the apparatus, make it possible to effect the direct modulation and so on and the invention will now be described by way of example with reference to a case employing laser diodes.

In accordance with the present invention, suitable materials for use as recording media may be such that the optical constants vary before and after the recording as mentioned previously, that is, the optical constants are decreased thus generally decreasing the reflectivity and increasing the transmittance when heated and then cooled rapidly and the optical constants are increased thus increasing the reflectivity and decreasing the transmittance when heated and then cooled slowly. For example, such suitable materials may be provided by forming thin films of chalcogenide glass and thin films essentially consisting of TeOx on substrates such as glass sheets or plastic sheets by such methods as vapor deposition and sputtering.

The recording-erasing principles of the recording mediums differ subtly depending on the compositions of the materials. For example, there are materials such as chalcogenide glass in which the crystalline-amorphous phase transformation makes a great contribution, those such as TeOx materials in which a change in the crystalline particle size has a great effect, others in which the direction of grain growth makes a contribution and so on. However, this has no direct bearing on the method of this invention and does not influence the invention. Here, for simplicity of expression, this will be described by taking the case of the amorphous-crystalline phase transformation.

It is essential that the substrates are formed with beam guiding tracks (U.S. Pat. No. 4,385,303). The method of performing the concurrent erasing and recording on the recording mediums by means of the recording and erasing method of this invention will now be described.

Figure 1:
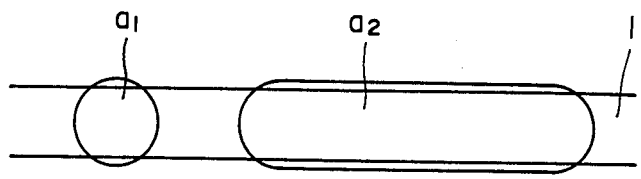
Figure 2:
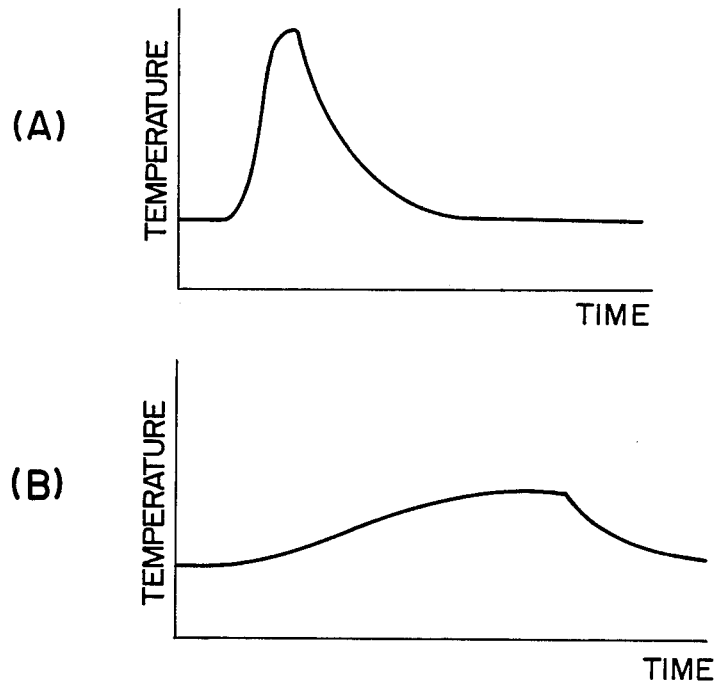
Figure 3:
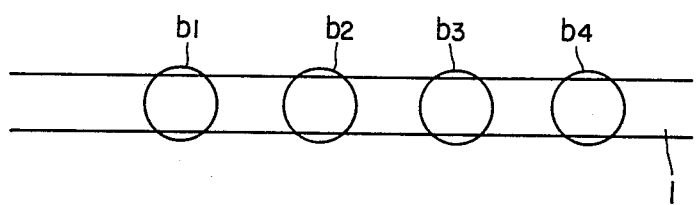
FIG. 3 shows a spot arrangement in which a plurality of laser spots are arranged on the same track.
Figure 4:
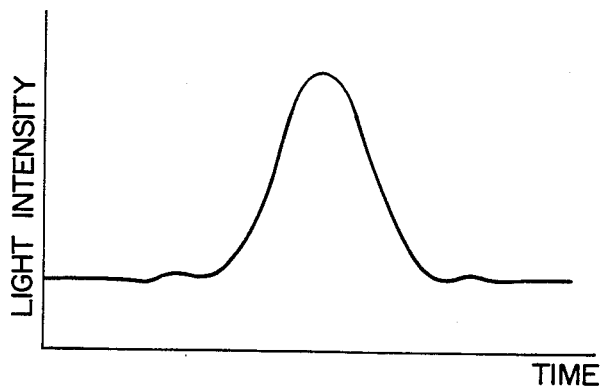
FIG. 4(A) shows an intensity distribution diagram of the recording laser spot.
FIG. 4(B) shows the manner in which the temperature of the exposed area is varied in response to the crossing of the laser spot.
Figure 4:
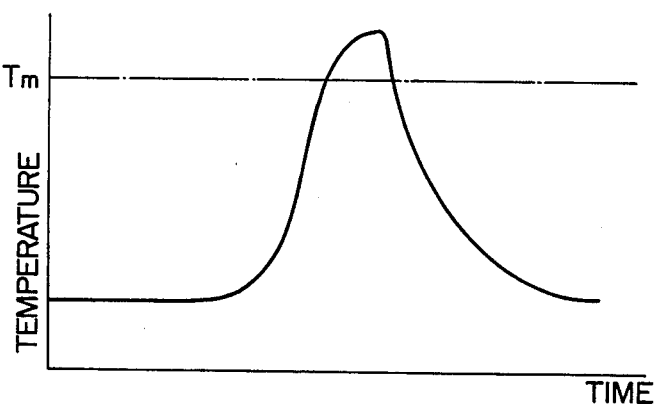

Since the recording medium is in the amorphous state as mentioned previously, when effecting the recording, the recording medium must preliminarily be changed to a state (crystalline state) which is high in reflectivity and low in transmittance. Means for changing to the crystalline state include a method of maintaining the recording medium higher than the crystallization temperature and treating the whole surface at a time by means of a heat treatment or the like and a method of treating each of the tracks, as it is used, on the apparatus by using the erasing beam. A description will be first made about the case in which the whole-surface heat treatment is effected. In any case, the recording utilizes the crystalline to amorphous transformation. During the recording, the laser beam power of the laser diode is increased and the beam is focussed through a lens system thereby projecting it with an increased light power density. Where the optical disk is rotated at 1,800 rpm, assuming that the half-width of the beam spot intensity power distribution is about 1 $\mu m$, the time required for a point on the disk to cross the light spot of the beam at the position of the disk radius of 100 mm is about 50 nses. FIG. 4(A) shows the exposure light intensity distribution and FIG. 4(B) shows the variation in the temperature of the exposed area. The beam spot fully focussed to the extent of the wavelength limit has a high power density so that the temperature of the exposed area is raised rapidly and the melting point Tm is exceeded instantaneously. After the beam spot has passed over the exposed area, the heat is diffused into the substrate and the exposed area is cooled rapidly. Thus, a transformation from the crystalline state to the amorphous state takes place so that generally the reflectivity is decreased and the transmittance is increased thereby effecting the recording.

The reproduction of the recorded information is effected by projecting the laser beam reduced in power so as not to cause any change in the recorded signal and reading the changes of the optical properties due to the recording as a change of the reflected light from the disk or a change of the light transmitted through the disk.

During the erasing, in the like manner as the recording, firstly the light power from the laser diode is increased and the beam is focussed through the lens system thereby projecting it as a first beam spot with an increased light power density. In this case, while the first beam spot needs not be circular in shape as the recording spot, at any rate the temperature of the exposed area must be selectively raised rapidly so as to reach the melting point. When the recording film is melted its atomic arrangement is temporarily changed to a random state completely and its previous hystory is lost. Thus, by equally exposing without distinction the signal area and the areas adjacent to the signal, it is possible to effect the complete erasing.

The present invention features that immediately after the melting of the exposed area by the first spot, the second erasing spot is projected so that due to the projection of the second spot while the exposed area is still in the melted state, the exposed area is slowly cooled from the liquid phase and a more complete crystalline state is obtained thus generally increasing the refrectivity and decreasing the transmission and thereby effecting the erasing more completely than the conventional methods. In this case, as for example, a method of decreasing the second spot in light power density as compared with the first spot and forming the spot into an elongated shape through the lens system is used so as to increase the exposure time and obtain the desired slow cooling condition.

Figure 5:
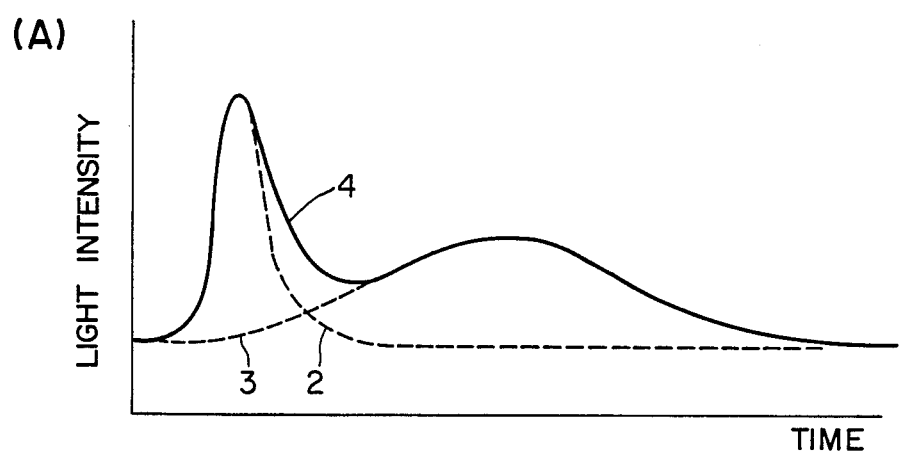
FIG. 5(A) is a light intensity distribution diagram of a spot arrangement in which two erasing laser spots are arranged on the same track.
FIG. 5(B) shows the manner in which the temperature of the exposed area is varied in response to the successive crossing of the two erasing spots.
FIG. 5(C) shows the manner in which the temperature of the exposed area is varied when exposed only to the second spot of the erasing spots.
Figure 5:
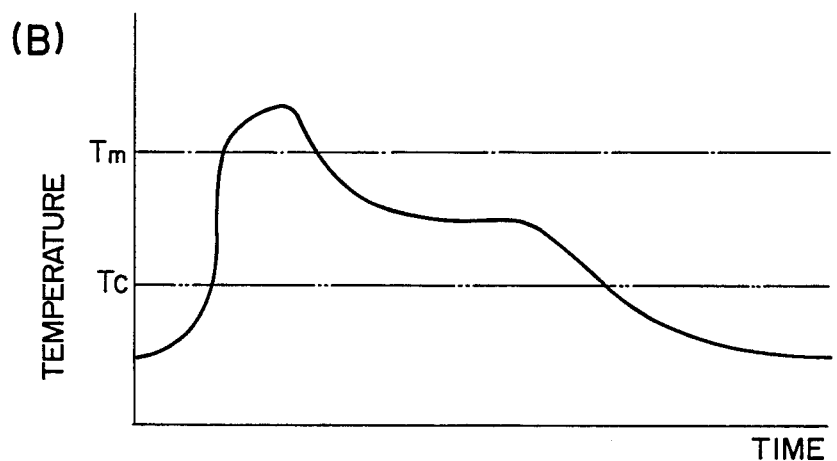
Figure 5:
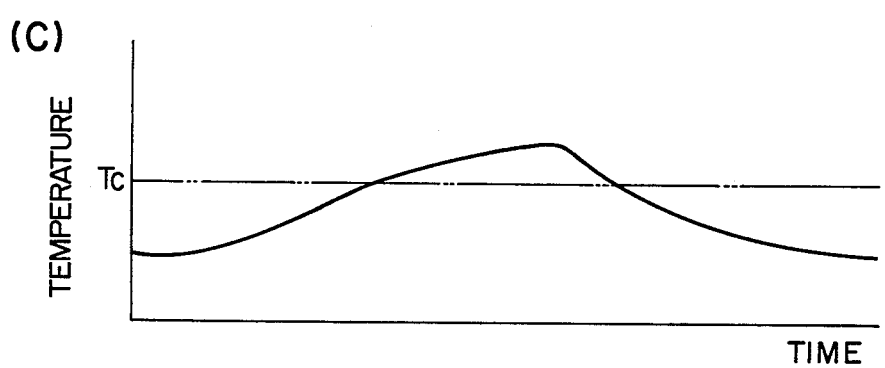

FIG. 5(A) shows the light intensity distributions obtained when two erasing spots are arranged along a straight line on the same track and FIG. 5(B) shows the manner in which the temperature of a point is varied when passed over successively by the two spots. After the temperature of the exposed area has been increased rapidly by the first spot so that it has reached the melting point, due to the effects combined with that of the second spot, the exposed area is cooled rather slowly until it again becomes lower than the melting point and then it is maintained at a temperature sufficiently higher than the crystallization temperature Tc thereby efficiently effecting the erasing. FIG. 5(C) shows the temperature variation of the exposed area when exposed to the second spot alone without using the first spot. A considerable part of the erasing beam spot is consumed merely for the purpose of increasing the temperature to the crystallization temperature thus making no contribution to the actual crystallization (erasing) and the efficiency is considerably low as compared with the two spot erasing method. From this it will be seen that in the case of the two-spot erasing method, the second spot is sufficient even if its length is much shorter as compared with that of the second spot used alone and the use of a spot of a practical length can fully meet the requirement even in the case of high peripheral or rotational speeds.

The recording of the new signals while erasing the recorded track or the so-called concurrent erasing and recording can be carried out by providing a recording beam spot as a third spot after the second spot. In this case, in order to ensure the same temperature rise condition as required for recording onto an unrecorded track, it is necessary to provide an interval so as to eliminate the preheating effect of the second spot. Conversely, as another idea, the desired temperature rise condition can also be obtained by effecting the recording by use of heating of the preceding two spots (erasing spots) even during the recording onto the unrecorded track. By so doing, there is the effect of making it possible to arrange the third spot close to the second spot and thereby focussed it easily through the same optical system as the first and second spots and decreasing the output of the laser for recording by utilizing the preheating by the erasing beam spots. Where the concurrent erasing and recording is not effected, the third spot is not needed and the first spot can be focussed into a circular shape so as to be used as a recording and reproducing spot. Also, while the second spot may for example be formed into an elongated elliptical spot of beam by such a method which focusses the laser beam of the elliptical shape from the laser diode through a cylindrical lens or the like so as to elongate in one direction only as mentioned previously, it is also possible to use a plurality of laser beams disclosed in U.S. Pat. No. 4,403,318 so as to produce on the whole the same effect as the second spot and other effects such as successively decreasing the light power density of each of the plurality of beam spots from the preceding one to enhance the slowly cooling effect.

In accordance with the invention, the light beam from each of the laser diodes is focussed through the optical system and projected onto the optical disk and the plurality beam spots must be arranged in a line parallel to the tangential direction of the rotation of the disk. In this case, where the beam from each of the plurality of laser diodes is focussed onto the optical disk through a separate optical system, even if the laser diodes are arranged in a line, there is the possibility of the focussed images not being arranged in a line on the disk. Thus, it is advantageous to focuss the light beams from all the laser diodes through the same optical system. In this case, it is also convenient to arrange the plurality of laser diodes in a line as a unit and it is more desirable to fabricate the laser diodes as a chip. In the latter case, it is necessary that each of the laser diodes is driven independently of each other.

While, in this invention, the basic techniques such as the tracking servo control and the focusing servo control for performing such acts of recording, reproducing and erasing the optical disk are techniques already well known in the art, what is important is the fact that in the case of the two-spot arrangement, for example the first and second spots have different wavelengths and are completely separable by such a method as using optical filters and that only the third spot is also separable by the same method in the case of the three-spot arrangement. This is important for preventing the servo control of the system from being disturbed.

As described hereinabove, the recording and erasing of signals in higher quality and in real time has been made possible through the use of a plurality of laser diodes arranged in a line. The above-described contents will now be described in greater detail with reference to the drawings.

Figure 6A:
FIG. 6A shows a spot arrangement for a case in which the erasing is effected by two beam spots.

FIG. 6 shows a train of beam spots projected in a line onto an optical disk and a train of record pits and the above-described contents will be described. FIG. 6A shows a case employing two laser diodes. Designated at $C_1$ and $C_2$ are the beam spots on the disk. The spot $C_1$ is a spot of the laser beam from laser diode having a wavelength of 830 nm, for example, and used for recording, reproducing and controlling purposes and erasing purposes, and the spot $C_2$ is a spot of laser beam from laser diode having a wavelength of 780 nm, for example, and elongated through the optical system and used only for erasing. The combination of wavelengths may be such that the spot $C_1$ is 780 nm in wavelength and the spot $C_2$ is 830 nm in wavelength or alternatively the spot $C_1$ is 810 nm in wavelength and the spot $C_2$ is 860 nm in wavelength. While, from the standpoint of increasing the recording density, it is advantageous to design the system so that the spot $C_1$ has a shorter wavelength and the spot $C_2$ has a longer wavelength, presently the limit to the wavelengths of low-noise, high-output laser diode is about 830 nm and it is realistic to select so that the spot $C_1$ has a wavelength of 830 nm and the spot $C_2$ has a wavelength of 780 nm or 880 nm, for example. The power output of the spot $C_1$ is decreased and the object area is searched while tracing the track. Then, the power of the spot $C_1$ is increased and the recording is effected. During the erasing, the power of the spot $C_1$ is decreased and the object area is searched while tracing the track. Then, the power of the spot $C_1$ is increased and simultaneously the spot $C_2$ is projected thereby effecting the erasing. Where the rerecording is to be made, it is effected after a turn. While the effectiveness is increased with an increase in the spot length of $C_2$, from the standpoint of equipment design, however, if the required light power density is 0.5 mw/$\mu$m$^2$ or over and the transmission efficiency of the optical system is 60% for example and in consideration of the capacity loss of the recording zone and actually the fact that the presently available light power output of laser diode is about 25 mw at the most, the limit to the spot length of $C_2$ is 30 to 40 $\mu$m at the most and it should preferably be limited to 20 $\mu$m from 1 more realistic point of view. Conversely, shorter spot lengths of about 5 $\mu$m or over are effective. Also, the interval between the two spots must be determined in accordance with the properties of the material and the peripheral speed of the disk or the light power density of the first spot. In the case of a recording film having the composition of $Te_{60}Ge_5Sn_{15}O_{20}$ (atomic %), for example, the time required for its transformation from a melted state to a hardened state is relatively short and thus it is necessary that the interval between the two spots is reduced and the light power density of the second spot is selected rather high. Where the light power density of the first spot is selected as 10 mw/$\mu m^2$ and the peripheral speed is selected between 9.4 m/s and 17 m/s (disk diameter=200 mm, rotation speed = 1,800 rpm), with the length of the second spot being selected as 20 $\mu m$ in terms of the half-width value, the erasing function is performed effectively if the distance between the centers of the two spots is selected between 3 $\mu m$ and 30 $\mu m$. Also, where a material prepared by adding 2 to 10% of Au to the previously mentioned system is used, its melted state is kept relatively longer so that the distance between the two spots can be selected slightly longer and also—their light power densities can be selected relatively lower. Under the same conditions as the previously mentioned system, the erasing function is performed effectively if the spot distance is selected between 5 $\mu m$ and 60 $\mu m$. As regards the difference due to the peripheral speeds, the light intensities of the two spots can be varied independently of each other in such a manger that as for example, the light intensity is selected higher on the disk outer periphery than on the inner periphery thereby ensuring the same spot distance on the inner and outer peripheries, respectively. Generally, if, for example, the peripheral speed is selected between 3 m/s and 17 m/s and the length of the second spot is selected between 10 and 40 $\mu m$, the spot distance in terms of a center distance can be selected between 3 $\mu m$ and 100 $\mu m$.

Figure 6B:
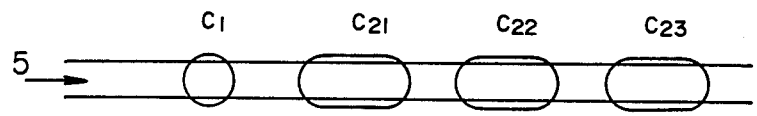
FIG. 6B shows a spot arrangement for a case in which the erasing is effected by a plurality of second spots.
Figure 7A:
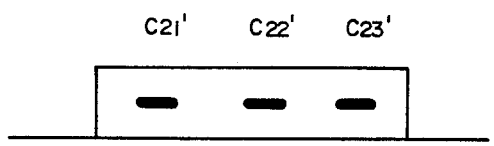
FIG. 7A shows an emitted light pattern of a laser array formed on a chip.
Figure 7B:
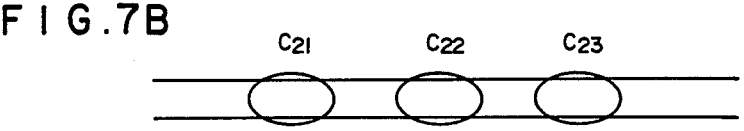
FIG. 7B shows the shape of spots on an optical disk.

FIG. 6B shows another embodiment in which three laser diodes are used to provide the second spot. Designated at $C_1$ is a spot of a laser beam from laser diode which functions in the like manner as its counterpart in FIG. 6A and designated at $C_{21}$, $C_{22}$ and $C_{23}$ are laser beam spots of diode lasers used for erasing purposes only. In this case, while the three lasers are assembled in a line as a unit as mentioned previously, or the four lasers including the spot $C_1$ may for example be assembled in a line as a unit by the application of the conventional method (U.S. Pat. No. 4,403,318), it is not easy to mount a plurality of lasers so as to focuss their beam spots on a straight line and moreover there is a difficulty that the presently available laser diodes are not sufficiently small in size making it impossible to reduce the spot distance satisfactorily. Therefore, they should preferably be formed by a so-called laser array method which forms a plurality of lasers on a single chip. In this case, to form laser diodes of considerably different light power outputs on the same chip is not an easy matter and therefore the spot $C_1$ and the spots $C_{21}$ to $C_{23}$ are separately provided. FIG. 7A shows an emission pattern of laser diodes $C_{21'}$ to $C_{23'}$ by a laser array formed on a single chip. The laser diodes $C_{21'}$ to $C_{23'}$ correspond to the spots $C_{21}$ to $C_{23}$ in FIG. 6B. If, for example, the emission region size, distance between each emission region and power output of the laser diodes $C_{21'}$ to $C_{23'}$ are respectively selected 1 $\mu m \times 5$ $\mu m$, 3 $\mu m$ and 10 mw and the magnification of the optical system is selected to form an image of 1:1 magnification on the optical disk, with the transmission efficiency of 60%, it is possible to obtain the same or greater effect than an elongated spot of about 20 $\mu m$ in spot length and about 1 mw/$\mu m^2$ in light power density. The distance between the lasers and the emission region size can be varied in accordance with the properties of a material used.

Figure 6C:
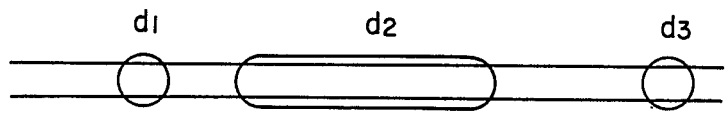
FIG. 6C shows an arrangement of beam spots for effecting the concurrent erasing and recording operations.

FIG. 6C shows another embodiment which differs from the embodiment of FIG. 6A in that a recording, reproducing and servo controlling laser diode is added to provide a third spot and this system makes possible the simultaneous erasing and recording. In this case, spots $d_1$ and $d_2$ are of the same wavelength of 780 nm, for example, and they are used for erasing purposes only. A spot $d_3$ of a wavelength of 830 nm is provided by focussing the laser beam from laser diode into a circular shape and used for recording reproducing and servo controlling purposes. The same concept as in the case of FIG. 6A can be applied to the combination of wavelengths.

Firstly, the power of the spot $d_3$ is decreased and the object area is searched while tracing the track. Then, the spots $d_1$ and $d_2$ are successively projected onto the object area and the signal thereat is erased. Immediately thereafter, the light power of the spot $d_3$ is increased and projected thereby recording the new signal. Similarly as the distance between the spots $d_1$ and $d_2$, the distance between the spots $d_2$ and $d_3$ must be determined in accordance with the properties of the material and the peripheral speed of the disk or the light power of the spots $d_1$ and $d_2$. For example, a system such as the previously mentioned $Te_{60}Ge_5Sn_{15}O_{20}$ can be very easily changed to an amorphous state and it needs not be cooled so rapidly from its melted state. Thus, the distance between the spots $d_2$ and $d_3$ can be reduced sufficiently by with utilizing the preheating by the spot $d_2$ and thereby reducing the required recording power. Where, for instance, the length of the second spot is selected 20 $\mu m$ in terms of a half value, its light power density 0.8 mw/$\mu m^2$ and the peripheral speed between 9.4 m/s and 17 m/s, if the distance between the centers of the spots $d_2$ and $d_3$ is 7 $\mu m$ or over, the recording can be effected and the recording power can be reduced by about 20% as compared with the case where the spot $d_2$ is not used. While the effect of the variations in recording conditions among different materials can be avoided by projecting the spot $d_2$ at a distance of about 30 $\mu m$ or over from a position where the spot $d_2$ attains an intensity of $1/e^2$, for example, it is desirable to reduce this distance as far as possible so as to decrease the recording capacity loss of the disk and the distance should be limited to about 100 $\mu m$ at the most.

Figure 8A:
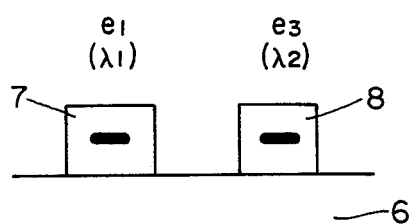
FIG. 8A shows the manner in which two laser diodes are combined as a unit.
Figure 8B:
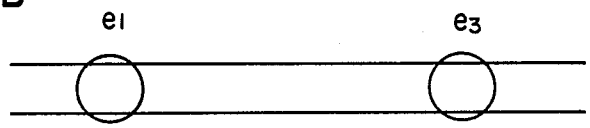
FIG. 8B shows the spots projected onto a disk by the laser diodes of FIG. 8A.

As regards means for providing this three-spot arrangement, one means attains the arrangement by arranging beam spots from three pieces of laser diode along a straight line on the optical disk through an optical system. However, rather delicate adjustments are required for this purpose. Another means attains the arrangement relatively easily by preliminarily assembling as a unit a light source for forming a first spot and a light source for forming a third spot, focussing the beams from the two lasers on the unit onto the optical disk in combination with a second beam spot and thus arranging the three spots on a straight line. FIG. 8A shows the manner in which two laser diodes of different wavelengths are assembled as a unit. Laser beams $e_1$ (e.g., $\lambda_1 = 780$ nm) and $e_3$ (e.g., $\lambda_3 = 830$ nm) are focussed into two spots apart by a relatively wide distance on the track as shown in FIG. 8B. Then, another laser beam spot $e_2$ (e.g., $\lambda_2 = 780$ nm) can be elongated and projected through the optical system so as to be positioned between the spots $e_1$ and $e_3$. The elongated spot may be replaced with the laser spot array of FIG. 6B.

Third means forms the spots $e_1$ and $e_3$ of FIG. 8B as a laser spot array. In this case, while the adjustment is made easier the lasers of the different wavelengths $\lambda_1$ and $\lambda_3$ must be oscillated on one single chip and the presently available array techniques cannot meet the requirement fully. Thus, it is considered that the second means should be used.

From the foregoing, it will be seen that this invention provides a method which employs at least two laser diodes for recording and erasing signals in real time on a recording medium whose optical constants are decreased when heated and then cooled rapidly and increased when heated and then cooled slowly and which is capable of obtaining a completely erased state without any unerased residual signal during the erasing.

The invention provides another method which is capable of performing high-quality concurrent erasing and recording by using at least three laser diodes.

To obtain the above-mentioned effects, the invention further provides the design conditions and methods of arrangement of beam spots required for constructing the desired optical head.

What is claimed is:

1. An optical information recording/erasing method for irradiating light onto a state-changeable photosensitive recording film formed on a substrate so as to record erase information on said recording film, said recording film being made of a material whose optical properties vary in accordance with light irradiating conditions, said method comprising:
   (a) initially irradiating an area on said recording film with said irradiating light with a sufficient power level to raise the temperature of said area of said film to above its melting point, thereby cancelling the recording history of said area on said film;
   (b) allowing the temperature of said film at said area to cool to below its melting point;
   (c) performing at least one of a recording and erasing operation after said area cools to below its melting point, said recording operation being performed by rapidly cooling said area on said film by at least one of (1) suddenly removing said irradiating light and (2) suddenly reducing the light power irradiating said area of said film, said erasing operation being performed by a slower cooling of said area on said film by a slower reduction in the light power irradiating said area of said film.

2. A method according to claim 1, wherein a source of said irradiating light comprises a plurality of laser diodes.

3. An optical information recording/erasing method for irradiating light onto an optical disk having a state-changeable photosensitive recording film layer formed on a substrate so as to record/erase information on said recording film, said recording film being made of a material whose optical properties vary in accordance with light irradiating conditions, said method comprising the steps of:
   (a) initially irradiating an area on said recording film with said irradiating light with a sufficient power density to raise the temperature of said area of said film to above its melting point, thereby cancelling the recording history of said area on said film;
   (b) allowing the temperature of said film at said area to cool to below its melting point;
   (c) performing at least one of a recording and erasing operation after said area cools to below its melting point, said recording operation being performed by rapidly cooling said area on said film by at least one of (1) suddenly removing said irradiating light and (2) suddenly reducing the light power density irradiating said area of said film, said erasing operation being performed by a slower cooling of said area on said film by a slower reduction in the light power density irradiating said area of said film.

4. A method according to claim 3, wherein a source of said irradiating light comprises a plurality of laser diodes.

5. A method according to claim 3, wherein during said recording operation a beam of light is focused into a first spot of circular shape having a light power density sufficient to raise the temperature of said irradiated area over the melting point of said recording film, and during an erasing operation, a second spot of elliptic shape having lower power density which is not sufficient to rise the temperature of the irradiated area over the melting point of said recording film, but which is sufficient to keep said temperature near the glass transition temperature of said recording film, is applied immediately after said first circular spot such that a longitudinal dimension of said second elliptic spot lies on the circumference of said first circular spot, said first and second spots irradiating said area successively.

6. A method according to claim 5, wherein during said erasing operation both said first circular spot and second elliptic spot are operated in a continuous light mode and irradiated onto not only a recording area but also a non-recording area equally.

7. A method according to claim 5, further comprising the step of irradiating said film with a third irradiating light focused into a circular shape onto said irradiated area after said second elliptic spot thereby concurrently erasing and recording said film.

8. A method according to claim 7, wherein during recording said erasing light is always in operation.

9. A method according to claim 5, wherein the length of said second elliptic spot is selected between 5 um and 40 um.

10. A method according to claim 5, wherein the center distance between said first spot and said second spot is selected between 3 um and 100 um.

11. A method according to claim 3, wherein during sasid recording operation a beam of light is focused into a first spot of circular shape having a light power density sufficient to raise the temperature of said irradiated area over the melting point of said recording film, and during an erasing operation, a plurality of light spots having a lower density which is not sufficient to raise the temperature of irradiated area over the melting point of said recording film, but which is sufficient to keep said temperature of said recording film near the glass transition temperature of said recording film, said plurality of second light spots successively irradiating said area immediately after irradiation of said area by said first circular spot.

12. A method according to claim 11, further comprising the step of irradiating said film with a third irradiating light foucsed into a circular shape onto said irradiated area after said plurality of light spots thereby concurrently erasing and recording said film.

13. A method according to claim 10, wherein during recording said erasing light is always in operation.

14. A method according to claim 11, wherein the center distance between said first spot and said second plurality of spots forming a spot group is selected between 3 um and 100 um.

* * * * *